3,494,944
Patented Feb. 10, 1970

3,494,944
PROCESS FOR VACUUM DISTILLING RANDOMLY INTERESTERIFIED TRIGLYCERIDES TO PRODUCE NOVEL TRIGLYCERIDE FRACTIONS
Paul Seiden, Cincinnati, Ohio, assignor to The Procter & Gamble Company, Cincinnati, Ohio, a corporation of Ohio
No Drawing. Filed Aug. 29, 1966, Ser. No. 575,567
Int. Cl. A23d 5/02, 3/02
U.S. Cl. 260—410.7                            7 Claims

ABSTRACT OF THE DISCLOSURE

Hardened lauric acid oils are randomly rearranged, or randomly interesterified with hardened non-lauric acid oils containing predominantly $C_{16}$ and higher saturated fatty acids. The hardened randomized oils are distilled to produce fractions and residues useful in hard butter and margarine oil formulations.

---

This invention relates to the vacuum distillation of triglycerides to produce triglyceride fractions having characteristics which are substantially different from the characteristics of the original triglyceride composition. More particularly, this invention relates to a process for distilling randomly interesterified lauric acid oils having a low iodine value to produce novel distillates and residues which can be used as confectioners' hard butter and in the formulation of margarine oils.

Confectionery fats by definition include hard butters other than natural cocoa butter. These fats are employed in the manufacture of candy and cookie coatings, icings, and fillings for candies, cookies and other confections.

Hard butter must have a very short softening range and a complete melting point which is below body temperature. It must remain firm and brittle at storage and ordinary room temperatures. The crystal and polymorphic stability of the product should make it suitable for shelf storage for six months to two years; its appearance and texture should not substantially change during storage. It is also important that hard butter have a controlled shrinkage rate during cooling so that satisfactory mold release can be obtained in making molded and solid confectionery bar goods such as chocolate candy bars. The flavor and odor of hard butter must be acceptable and the product must be compatible with natural cocoa butter, cocoa powder, chocolate liquor, etc., and other ingredients commonly used in the confectionery arts.

A "melt-in-the-mouth" characteristic is also important in the formulation of margarine and other table spread products in which a sharp melting property and the absence of solids at body temperature are required. In terms of the Solids Content Index (SCI) which is a measure of the percent, by weight, solid in a fat or oil, a high quality margarine must have an SCI at 92° F. of 3.0 or less. The SCI of the margarine at lower temperatures must be sufficiently high that the margarine will be reasonably firm and heat stable at room temperature. At 80° F. the SCI of margarine should be between about 4 and about 10 SCI units. At 50° F. an SCI of about 25 units or preferably less is desirable so that the product will be spreadable at refrigerated temperatures. A pleasant buttery flavor and a crystal stability, as well as a smooth, creamy texture is also desirable.

Most commercial margarines have a reasonably straight SCI v. temperature curve; in other words, the content of solids in the margarine decreases lineally as a function of the temperature. Ideally, margarine is plastic in the range between 40° F. and 80° F., but melts quickly between 80° F. and 95° F.; therefore, a bend should appear in the curve between about 70° F. and 80° F. when the SCI of the margarine is plotted against temperature.

Hard butters have been prepared by numerous prior art techniques. For example, Roylance, U.S. Patent 2,928,-745, issued Mar. 15, 1960, discloses a process for preparing hard butter from palm kernel oil and mixtures of palm kernel oil and coconut oil by hardening, interesterifying, and fractionating the oil by means of a solvent. The hardening step is carried out either before or after the oil has been interesterified. The oil is hardened to an iodine value of less than 5 and preferably less than 1. Interesterification is conducted under conventional conditions which result in the random distribution of the fatty radicals in the glyceride molecules. The hardened and randomized oil is fractionated from a solvent to remove the low melting fractions; the residue fraction has the characteristics of hard butter.

In Blum, U.S. Patent 2,657,995, issued Nov. 3, 1953, natural lauric acid oils, preferably coconut oil, are distilled to produce hard butter fractions, principally residues. Oils of the coconut oil group are hydrogenated to a low iodine value (preferably less than 1) and distilled under high vacuum conditions at pressures below about 1 mm. of mercury and preferably below about 0.5 mm. of mercury. The fractions which are distilled exhibit progressive changes in their functional properties; the melting point rises, the melting range becomes narrower, and the saponification number for each fraction becomes progressively smaller. The distillates which are not suitable hard butters can be utilized for other edible purposes or they can be blended with other fractions to produce hard butter. A residue is obtained which is a useful hard butter by controlling the amount of distillate which is removed.

It has now been found that the techniques of hydrogenation, random interesterification and vacuum distillation can be combined in a new and novel way to produce distillates and residues of lauric acid oils which have unique and unexpected properties.

In accordance with the present invention randomly interesterified lauric acid oils having a low iodine value are vacuum distilled to produce residue fractions which are particularly well suited for use as hard butter and/or for admixture with other oils to produce margarine oils. The distillates which are produced by this process also have interesting and useful properties. In the preferred embodiment of this invention the lauric acid oils are randomly interesterified with up to about 15%, by weight, of the oil with a non-lauric acid oil containing predominantly $C_{16}$ and higher saturated fatty acids. Most preferably the corandomized oil has a high $C_{20}$–$C_{22}$ fatty acid content which materially increases the performance characteristics of the residue fractions in margarine and confectionery products. Unless the natural iodine value of the lauric acid oil or non-lauric acid oil is less than about 5, the oil is hydrogenated to an iodine value of less than about 5 either before or after it is interesterified and prior to the time it is distilled.

The most useful residue fractions produced by the present invention are characterized by their novel triglyceride content and SCI characteristics. The triglyceride distribution in these fractions produces an SCI at 80° F. of from about 50 to about 70 SCI units and an SCI at 98° F. of less than about 15 SCI units. The minimum SCI spread between 80°–98° F. is 46 units and averages about 52 SCI units.

It is the primary object of this invention to produce novel triglyceride compositions which are suitable for use as hard butters and in margarine formulations by vacuum distillation of randomly or corandomly interesterified lauric acid oils having an iodine value of less than about 5. Other objects of this invention will be apparent from the following detailed description of the invention and from the accompanying examples.

The lauric acid oils which are useful in the present invention include coconut oil, palm kernel oil, babassu oil, tucum oil, muru muru oil, and mixtures thereof. Coconut oil is the preferred lauric acid oil.

The lauric acid oil can be hardened to a low iodine value by any conventional hydrogenation technique using time, temperature, and pressure conditions which will result in an iodine value of less than about 5 and preferably less than about 1. The oil may be hardened at any stage in the present process before it is distilled. It is most convenient to harden the oil before it is randomly rearranged or before it is randomized with a non-lauric acid oil.

The non-lauric acid oils which are useful in this invention include oils containing predominantly $C_{16}$ and higher saturated fatty acids; for example, hydrogenated cottonseed oil, hydrogenated palm oil, tallow, lard and certain marine oils such as hydrogenated menhaden oil and hydrogenated herring oil. Hydrogenated rapeseed, mustard seed and wallflower seed oils are preferred because of their high content of $C_{20}$-$C_{22}$ saturated fatty acids. These oils are hydrogenated to an iodine value of less than about 5 and preferably less than about 1 in the same manner as the lauric acid oils at any stage of the present process before the corandomized mixture of oils is distilled. The non-lauric acid oils are used in amounts up to about 15%, by weight, of the oil mixture; however, smaller amounts, preferably about 1%, by weight, are preferred. A most highly preferred mixture is hydrogenated coconut oil and hydrogenated rapeseed oil, the rapeseed oil constituting about 1%, by weight, of the mixture.

The random esterification of the lauric acid oil and the randomization of the lauric acid oil with a non-lauric acid oil containing predominantly $C_{16}$ and higher saturated fatty acids is conducted in any manner which will insure a complete degree of randomization of the fatty acids in the triglyceride molecules. A suitable process for randomizing and corandomizing glyceride materials is described in Burgers et al., U.S. Patent 3,170,798, issued Feb. 23, 1965. In the Burgers et al. process an alkali metal hydroxide catalyst is used in the form of an aqueous solution containing hydroxide and glycerine.

The oils which are treated by the present method can be refined and bleached at any suitable stage in the process but preferably the oils are refined and bleached prior to hydrogenation. The refining and bleaching operations are carried out in any suitable conventional fashion. No separate deodorization step is ordinarily required because the free fatty acid content of the residue is generally reduced to less than .005% by the distillation process. The distillate can be deodorized in the customary manner when it is desired to reduce the content of free fatty acid in the distillate.

The fractionation by distillation of the randomly rearranged lauric acid oil and corandomized lauric acid and non-lauric acid oils is conducted without any significant decompostion, directed rearrangement, hydrolysis, or deterioration of the oils at absolute pressures below 15 mm. mercury in conventional distillation equipment. At a preferred operating pressure of about 2 mm. to about 6 mm. of mercury, fractionation is effected at temperatures between about 260° C. and about 340° C. The short chain (low melting) free fatty acids are distilled off at substantially lower temperatures between 170° C. and 200° C.; the intermediate low chain fatty acids are removed at temperatures below 220° C. When the temperature of the still reaches 260° C., the distillation of the short chain triglycerides commences. The intermediate chain triglycerides can be distilled at temperatures of about 290° C.

High vacuum distillation conditions using pressures below about 1 mm. mercury are not required in the present process but they can be employed. Nitrogen or other inert gas and/or steam stripping can be used in a known manner to increase the distillation rates and lower the temperature of the distillation process.

The distillation of the randomized and corandomized oils described in this invention produces distillates and residue fractions which are surprisingly different in their physical properties and composition from the fractions obtained when non-rearranged oils are distilled in the manner described in the aforementioned U.S. Patent 2,657,995 to Blum. Comparative distillations of hydrogenated coconut oil and hardened and randomly rearranged coconut oil produced fractions which were notably different in their SCI characteristics. The maximum SCI spread between 80° F. and 98° F. was 56 units in the case of the randomly rearranged coconut oil and only 45 units for the non-rearranged oil. The 98° F. SCI corresponding to the maximum 80°–98° F. SCI spread for the randomly rearranged oil was 3 to 5 units, whereas it is 20 to 25 SCI units for the non-rearranged oil.

Solvent fractionation of hardened and rearranged coconut oil in the manner described in the previously cited Roylance patent, U.S. Patent 2,928,745, will not produce fractions having the maximum 80°–98° F. SCI spread that can be obtained by distilling hardened and interesterified lauric acid oils. In a comparative analysis of the two processes, the maximum 80°–98° F. SCI spread which was obtained when hardened and randomized oil was solvent fractionated was 42.5 SCI units; a spread of 56 SCI units was obtained by distillation.

The following examples illustrate the process of the present invention and the products obtained therefrom. Unless otherwise stated, all quantities are expressed as parts by weight.

EXAMPLE 1

One hundred pounds of coconut oil were refined, bleached and hydrogenated in a conventional manner to an iodine value of 0.2 and randomly rearranged in the manner described in Burgers et al., U.S. Patent 3,170,798. The hydrogenated coconut oil was heated to 50° C. and charged to a rearrangement vessel along with 0.05%, by weight, of sodium hydroxide (0.05 pound) in the form of a 10% aqueous solution and 0.20%, by weight, glycerine (0.2 pound). The glycerine and sodium hydroxide solution were uniformly dispersed in the oil by mechanical agitation and nitrogen sparging. The mixture was kept under a vacuum equivalent to a pressure absolute of 0.5 inch of mercury and was heated to a temperature of 60° C. and held at that temperature for 30 minutes until the water present in the mixture had boiled off. The mixture was then heated to a temperature of 160° C. under an absolute pressure of 0.4 inch of mercury for 30 minutes while rearrangement occurred. After this time, the mixture was cooled down to 60° C.; the catalyst present in the rearranged esters was inactivated by the addition of food grade phosphoric acid in an amount equal to 1.6 equivalents of the total sodium hydroxide added to the mixture (0.8 pound). The oil-insoluble material which was formed during the rearrangement process was removed by filtering the interesterified oil through a plate and frame filter with the aid of diatomaceous earth. The SCI of the rearranged oil was determined; it indicated that substantially complete random rearrangement had occurred.

The interesterified coconut oil was conventionally distilled at a temperature of 280°–290° C. at an absolute pressure of 2.6 mm. of mercury in a stainless steel deodorizer which had been modified to permit condensation and recovery of distillate. Stripping steam was employed to assist in the removal of the distilate. After 55% of the distillate had been removed the temperature was reduced to 60° C.; the vacuum was released and the residue discharged. The SCI's of the residue at temperature intervals between 70° F. and 105° F. were determined; they are reported in Table I.

Table I

SCI (80°) at, °F.:
- 70 — 63.0
- 80 — 54.2
- 92 — 17.0
- 98 — 1.5
- 105 — 0

Thirty-five parts of the residue and 65 parts of refined, bleached and deodorized soybean oil were mixed to prepare a margarine oil. Eighty pounds of this margarine oil were melted and heated to 110° F. in a hot water steam-jacketed mix tank. 1.65 pounds of commercial milk powder and 2 pounds of salt were mixed (slurried) in 15 pounds of water. An emulsion was prepared from the margarine oil and the milk slurry with the addition of 0.05 pound monoglyceride prepared from partially hydrogenated soybean oil. The margarine emulsion was chilled through a conventional Votator A unit assembly and a B unit. Votators (chillers) are well known in the art; a description of such apparatus can be found at page 1066 of Bailey's Industrial Oils and Fats, ed. by Daniel Swern, 3d ed., Interscience Publishers, Inc., Westport, New York, 1964. The product extruded from the Votators was packed at 40° F. and tempered for 48 hours at 50° F.

Sample portions of the resultant margarine were tested by standard uniform testing procedures and compared with a butter control. Spreadability at 50° F. and eating quality were judged by a panel of experts and graded on a scale of 1 to 10; 1 being poor and 10 being excellent. Slump tests were also graded by a panel of experts on the same grading scale against standard photographs. Oil-off figures were quantitatively determined by measuring the oil lost by the margarine and butter samples after 48 hours at 80° F.; the figures reported below in Table II are the calculated percentage of lost oil.

TABLE II

|  | Butter as control | Sample |
|---|---|---|
| Spreadability grade 40° F | 4.3 | 7.1 |
| Oil-off 80° F./24 hours, percent | 7 | 2 |
| Slump grade 80° F./24 hours | 7 | 9 |
| Eating quality grade: | | |
| 40° F | 8.0 | 7.8 |
| 70° F | 8.0 | 8.1 |
| SCI (80°): | | |
| At 50° F | 23.9 | 20.4 |
| At 70° F | 10.2 | 11.1 |
| At 80° F | 6.9 | 5.2 |
| At 86° F | 4.7 | 1.6 |
| At 92° F | 2.0 | 0 |

The results in Table II show that margarine containing the residue fraction obtained by distilling hardened and randomly interesterified coconut oil had substantially better spreadability than butter, very low oil-off, a good slump grade, and an eating quality at both 40° F. and 70° F. which was comparable to or equal to that of the butter control.

EXAMPLE 2

Ninety-nine pounds of refined and bleached coconut oil were mixed with one part of refined and bleached rapeseed oil; and mixture was hydrogenated to an iodine value of 1.0. The hydrogenated blend of oil was randomly interesterified in the manner described in Example 1 and distilled at an absolute pressure of 10 mm. of mercury and a temperature of 290° C. until 55% of the blend has been removed. The SCI's reported in Table III were determined by an analysis of the residue.

Table III

SCI (80°) at, °F.:
- 70 — 69.0
- 80 — 62.8
- 92 — 28.0
- 98 — 9.2
- 105 — 0

Thirty parts of the residue were mixed with 70 parts of refined, bleached and deodorized soybean oil. Similarly, 30 parts of the residue were mixed with refined, bleached, and deodorized sunflower seed oil. Margarines were prepared from each of these oil blends in the manner described in Example 1; these margarines were evaluated as described in Example 1 with the following results:

TABLE IV

|  | 30% residue, 70% soybean oil | 30% residue, 70% sunflower seed oil |
|---|---|---|
| Spreadability grade 40° F | 8.0 | 7.9 |
| Oil-off 80° F./24 hours, percent | 3 | 5 |
| Slump grade 80° F./24 hours | 8 | 7 |
| Eating quality grade 40° F | 8.1 | 8.3 |
| Eating quality grade 70° F | 8.0 | 8.3 |
| SCI (80°): | | |
| At 50° F | 19.0 | 19.2 |
| At 70° F | 11.3 | 12.1 |
| At 80° F | 5.5 | 6.1 |
| At 86° F | 1.5 | 1.9 |
| At 92° F | 0 | 0 |

These results show that both margarine oils produced margarines having good spreadability, oil-off, slump, and eating quality at 40° F. and 70° F. The presence of the rapeseed oil in the corandomized mixture with coconut oil improved the spreadability grade of the margarine samples at 40° F. and 70° F. and also improved the eating quality of these margarines when compared to similar margarines containing no rapeseed oil. In each instance the SCI of the margarine samples in this example diminished between 50° F. and 92° F. in a non-linear fashion with the greatest drop in content of solids coming between 80° F. and 92° F.

The soybean oil and sunflower seed oil portions of the margarine oil in this example can be replaced either in whole or in part by cottonseed oil, corn oil, lard, or tallow without substantially affecting the results.

The distillate fraction can be used to prepare ice cream coatings or shortenings for preparing icing products. The distillate can also be used in conventional margarines in admixture with other oils as a base stock.

EXAMPLE 3

Ninety-four pounds of refined, bleached and hydrogenated coconut oil having an iodine value of 0.2 were mixed with five pounds of refined, bleached and hydrogenated palm oil having an iodine value of 2.8 and one part of refined, bleached and hydrogenated rapeseed oil having an iodine value of 3.5. The blend of coconut oil, palm oil, and rapeseed oil was randomly rearranged and distilled in the manner described in Example 1 at 1.0 mm. of mercury and 300° C. After 50% of the charge had been distilled the distillation was dicontinued. The SCI values of the distillate are reported below in Table V.

Table V

SCI (80°) at, °F.:
- 70 — 64.4
- 80 — 57.1
- 92 — 24.6
- 98 — 9.4
- 105 — 0

Thirty pounds of the residue were mixed with 70 pounds of a refined, bleached and deodorized mixture of corn oil and soybean oil, and a margarine was prepared and evaluated in the manner described in Example 1. The results of the evaluation of the margarine are given below in Table VI.

Table VI

- Spreadability grade 40° F. — 7.1
- Oil-off 80° F./24 hours percent — 3
- Slump grade 80° F./24 hours — 7
- Eating quality grade, °F.:
  - 40 — 7.7
  - 70 — 7.9

Table VI—Continued

SCI (80°) at, °F.:
```
50 _____ 18.9
70 _____ 11.1
80 _____  5.3
86 _____  1.6
92 _____  0
```

Results which are substantially similar to those results obtained in this example can be achieved by randomly rearranging the blend of oils prior to hydrogenation.

EXAMPLE 4

One hundred pounds of coconut oil were refined, bleached and hydrogenated to an iodine value of 0.2 and randomly esterified and distilled at .4 mm. of mercury and 320° C. in the manner described in Example 1. The distillation was discontinued after 50% of the charge had been distilled off. The residue was compared to a typical hard butter obtained by corandomizing 90% palm kernel oil having an iodine value of 0.7 and 10% rapeseed oil having an iodine value of 2.5. The comparative results are shown in Table VII.

TABLE VII

|  | Distillation residue | Typical hard butter |
|---|---|---|
| SCI (80°): |  |  |
| At 70° F | 60.0 | 56.2 |
| At 80° F | 47.5 | 46.0 |
| At 92° F | 12.2 | 15.8 |
| At 98° F | 0 | 4.1 |
| Complete melting point, °F | 97 | 103 |
| Wiley melting point, °F | 96 | 101 |
| Percent free fatty acid | 0.006 | 0.05 |

"Arizona" and conventional milk confectioners coatings were prepared and evaluated using both the hard butter residue and the hard butter made from palm kernel oil and rapeseed oil as the principal fat ingredients. These coatings were prepared by mixing the following ingredients in the manner described below:

|  | A | B |
|---|---|---|
|  | "Arizona" | Milk |
| Ingredients, percent: |  |  |
| Granulated sugar | 42 | 52.32 |
| Cocoa | 23 |  |
| Chocolate liquor |  | 10.00 |
| Hard butter | 35 | 25.00 |
| Cocoa butter |  |  |
| Whole milk powder |  | 12.00 |
| Salt |  | .12 |
| Vanillin |  | .06 |
| Lecithin |  | .50 |

The dry ingredients were mixed together in a stainless steel bowl by hand mixing. The hard butter, chocolate liquor and lecithin were melted and slowly added to the dry ingredients while they were being continuously mixed at 140° F. with an electric mixer at medium speed. The mixtures were then allowed to cool at room temperature with occasional hand stirring while the consistency of the confection noticeably thickened. When the mixture was partially set it was twice run through a four-roll stainless steel mill using the following roll temperature settings:

Roll number: Roll temperature, °F.
```
1 _____ 65
2 _____ 65
3 _____ 40
4 _____ 40
```

The resultant confectioners coatings were evaluated for their performance characteristics and the coatings prepared with the distillate residue hard butter were judged to be superior in many respects. In a conventional "snap" test, the coating containing the residue hard butter exhibited more snap at 85° F. than the coating containing typical hard butter; 185 grams of pressure were required to break a molded bar containing the residue hard butter, whereas only 120 grams were required to break an identical bar molded with the typical hard butter. The eating quality of the two bars was compared on a scale of 1 to 10; 10 being superior. The eating quality of the bar containing the distillate residue was judged to be a 7, and the eating quality of the typical hard butter bar was judged a 6. The gloss retention of the milk coating was measured in a standardized test utilizing a photovolt reflectometer. The percent loss on bars molded from both coatings was determined. The initial percent gloss on the bar molded from the residue hard butter was 10%; the initial gloss of the bar molded from the typical hard butter was 10.5%. These bars were cycled between 90° F. for four hours and 60° F. storage for eight hours, after which time the gloss on each bar was again measured. The gloss was measured after each cycle until the sample read 0% or had "bloomed." Only two cycles were required until the sample bar containing the typical hard butter had bloomed. Twelve cycles were necessary to cause bloom on the bar made with the distillate residue hard butter.

What is claimed is:

1. A process for preparing novel triglyceride compositions which comprises randomly rearranging a lauric acid oil having an iodine value of less than about 5, and then fractionally distilling the resulting randomized product at absolute pressures below 15 mm. of mercury and at temperatures ranging from about 260° C. to about 340° C. to obtain a residue and triglyceride distillate fractions.

2. The process of claim 1 wherein the lauric acid oil is selected from the group consisting of coconut oil, palm kernel oil, babassu oil, tucum oil, muru muru oil, and mixtures thereof.

3. The process of claim 1 wherein the lauric acid oil is coconut oil.

4. The process of claim 1 wherein the lauric acid oil is hydrogenated to an iodine value of less than 5.

5. The residue fraction produced by the process of claim 1 which is characterized by a minimum solids content index spread between 80° F. and 98° F. of 46 SCI units, and which has a solids content index at 80° F. of from about 50 to about 70 SCI units and a solids content index at 98° F. of less than about 15 SCI units.

6. The process for preparing novel triglyceride compositions which comprises randomly interesterifying a lauric acid oil having an iodine value of less than about 5 with up to about 15% by weight of the oil mixture of a non-lauric acid oil hydrogenated to an iodine value of less than about 5 and containing predominantly $C_{16}$ and higher saturated fatty acids, and then fractionally distilling the resulting randomized product at absolute pressures below 15 mm. of mercury and at temperatures ranging from about 260° C. to about 340° C. to obtain a residue and triglyceride distillate fractions.

7. The process of claim 6 wherein the non-lauric acid oil is rapeseed oil.

References Cited

UNITED STATES PATENTS

| 3,313,834 | 4/1967 | Allen et al. | 260—410.7 |
| 3,174,868 | 3/1965 | Teasdale et al. | 260—410.7 |
| 2,378,007 | 6/1945 | Eckey | 260—410.7 |

LORRAINE A. WEINBERGER, Primary Examiner

R. S. WEISSBERG, Assistant Examiner

U.S. Cl. X.R.

99—118